United States Patent
Christensen et al.

(10) Patent No.: US 9,517,606 B2
(45) Date of Patent: Dec. 13, 2016

(54) COMPOSITE STRUCTURE AND METHOD OF FORMING THEREOF

(71) Applicant: The Boeing Company, Huntington Beach, CA (US)

(72) Inventors: Stephen Christensen, Sammamish, WA (US); Jonathan H. Gosse, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 14/452,619

(22) Filed: Aug. 6, 2014

(65) Prior Publication Data
US 2016/0039167 A1 Feb. 11, 2016

(51) Int. Cl.
| B32B 1/00 | (2006.01) |
| B29C 65/72 | (2006.01) |
| B32B 5/18 | (2006.01) |
| B29C 70/40 | (2006.01) |
| B29D 99/00 | (2010.01) |
| B29C 44/56 | (2006.01) |
| B29K 83/00 | (2006.01) |
| B29K 105/04 | (2006.01) |
| B29K 683/00 | (2006.01) |
| B29L 31/22 | (2006.01) |

(52) U.S. Cl.
CPC .............. *B32B 1/00* (2013.01); *B29C 44/569* (2013.01); *B29C 65/72* (2013.01); *B29C 70/40* (2013.01); *B29D 99/0003* (2013.01); *B32B 5/18* (2013.01); *B29C 2793/009* (2013.01); *B29K 2083/005* (2013.01); *B29K 2105/046* (2013.01); *B29K 2683/005* (2013.01); *B29L 2031/22* (2013.01); *B32B 2266/0214* (2013.01); *B32B 2266/08* (2013.01); *B32B 2305/022* (2013.01); *B32B 2383/00* (2013.01); *B32B 2605/18* (2013.01)

(58) Field of Classification Search
CPC .... B32B 5/18; B32B 2266/08; B32B 2383/00; Y10T 428/249976
See application file for complete search history.

(56) References Cited

U.S. PATENT DOCUMENTS

| 4,296,540 A * | 10/1981 | Potter .............................. 29/460 |
| 6,418,688 B1* | 7/2002 | Jones, Jr. .................... 52/396.04 |
| 6,562,436 B2 | 5/2003 | George et al. |
| 2011/0254267 A1* | 10/2011 | Marengo ....................... 285/405 |
| 2013/0344291 A1* | 12/2013 | Pearson et al. ............... 428/157 |

FOREIGN PATENT DOCUMENTS

| EP | 2662202 A2 | 11/2013 |
| EP | 2666622 A1 | 11/2013 |
| EP | 2676787 A1 | 12/2013 |

OTHER PUBLICATIONS

EPO Extended Search Report for related application 15170664.5 dated Dec. 9, 2015; 7 pp.

* cited by examiner

*Primary Examiner* — Hai Vo
(74) *Attorney, Agent, or Firm* — Armstrong Teasdale LLP

(57) ABSTRACT

A composite structure is provided. The composite structure includes a plurality of components coupled together forming a joint, wherein the plurality of components are oriented such that a gap is defined at least partially therebetween. A filler structure is positioned in the gap, and the filler structure includes a closed cell foam core.

5 Claims, 6 Drawing Sheets

COMPOSITE STRUCTURE AND METHOD OF FORMING THEREOF

BACKGROUND

The field of the present disclosure relates generally to composite structures and, more specifically, to filler materials for composite structures that facilitate restricting delamination of the composite structure.

Cracking of integrally stiffened composite structures, especially in aerospace applications, often initiates in a radius filler (i.e., noodle) located at an interface between a skin and integral stiffening elements of the composite structures. At least some known radius fillers are formed at least partially from an amount of resin. Cracks in the resin may form during manufacture of the composite structures as a result of improper tooling, improper handling of tools, and/or residual tensile strain. For example, residual tensile strain in composite structures may form as a result of a mismatch between the coefficients of thermal expansion creating a strain environment in the radius filler that exceeds the critical cracking strain of the resin. The geometry of the structure surrounding the radius filler creates a three-dimensional constraint to shrinkage upon cooling of the resin after it has been cured and hardened.

Exemplary radius filler materials include, but are not limited to, pre-impregnated (i.e., prepreg) composite materials (e.g., layered strips and/or rolled prepreg composite material), and/or pure resin. In at least some known composite structures, crack propagation in the radius filler can cause delamination of the plies in adjacent laminated joints. More specifically, crack propagation in the radius filler may initiate degradation of the laminated joints. While limiting the formation of cracks in the radius filler would ensure the integrity of the laminated joints, preventing cracks from forming entirely is generally difficult, if not impossible. Moreover, the difficulty in limiting crack formation in radius fillers increases as composite structures are fabricated in increasingly large sizes. As such, there is a need for systems and methods that ensure cracks in a radius filler do not initiate degradation of laminated joints.

BRIEF DESCRIPTION

In one aspect, a composite structure is provided. The composite structure includes a plurality of components coupled together forming a joint, wherein the plurality of components are oriented such that a gap is defined at least partially therebetween. A filler structure is positioned in the gap, and the filler structure includes a closed cell foam core.

In another aspect, a method of forming a composite structure is provided. The method includes coupling a plurality of components together forming a joint, wherein the plurality of components are oriented to form a radius gap therebetween. The method also includes forming a filler structure that includes a closed cell foam core, positioning the filler structure in the radius gap, and applying at least one of heat or pressure to the plurality of components and the filler structure.

The features, functions, and advantages that have been discussed can be achieved independently in various implementations of the present disclosure or may be combined in yet other implementations further details of which can be seen with reference to the following description and drawings.

DETAILED DESCRIPTION

The implementations described herein relate to composite structures including a radius filler structure that facilitates restricting delamination in radius gaps (i.e., noodle regions) in the composite structures. In the exemplary implementation, the filler structure includes a closed cell foam core. The closed cell foam core includes a plurality of core cells including side walls and void spaces defined by the side walls. The closed cell foam core is fabricated from a material that absorbs strain energy by enabling the side walls to yield plastically in response to hydrostatic tensile forces. Specifically, the filler structure is positioned in the radius gap of the composite structure, and the closed cell foam core has physical properties selected to ensure the structural integrity of the composite structure is substantially maintained during manufacture thereof. As such, the filler structure described herein does not include resin such that crack propagation in the resin cannot initiate degradation of the laminated joint.

Figure 1:
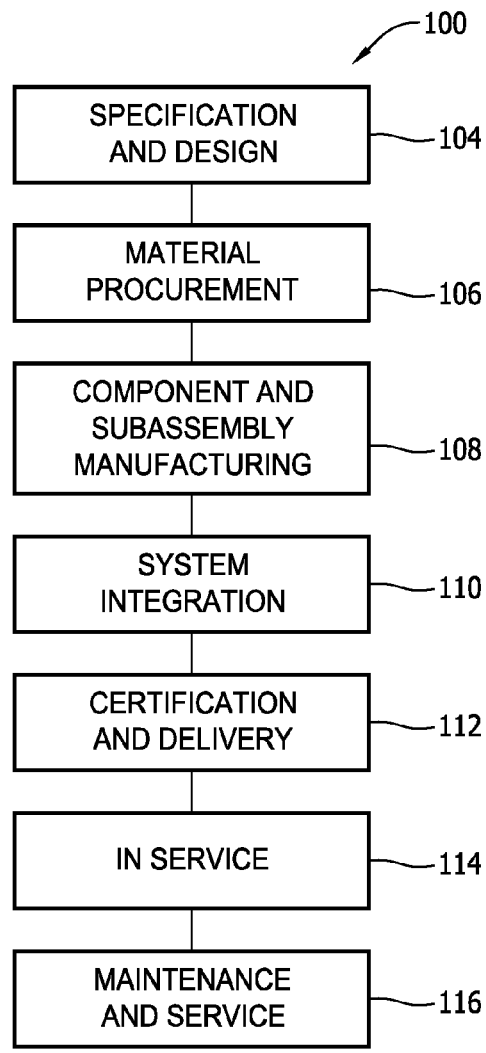
FIG. 1 is a flow diagram of an exemplary aircraft production and service method.
Figure 2:
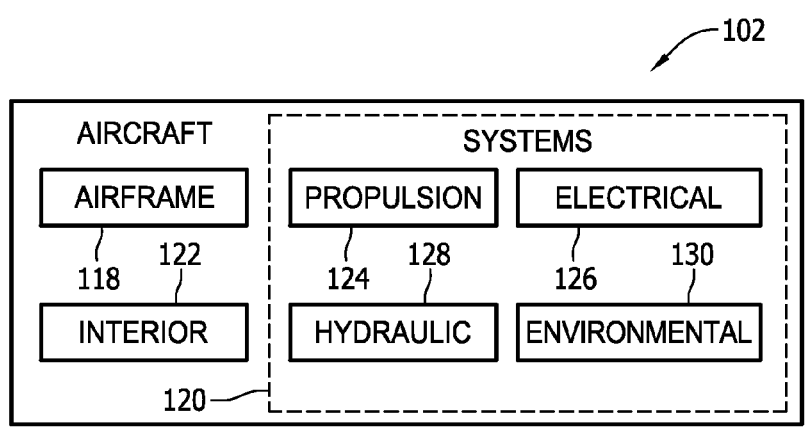
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
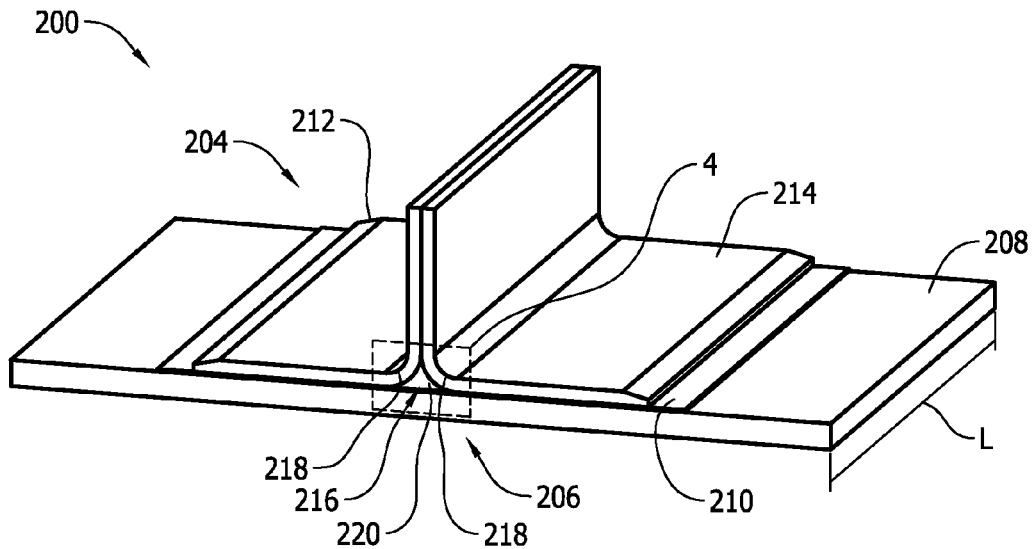
FIG. 3 is a schematic illustration of an exemplary composite structure that may be used in the aircraft shown in FIG. 2.
Figure 4:
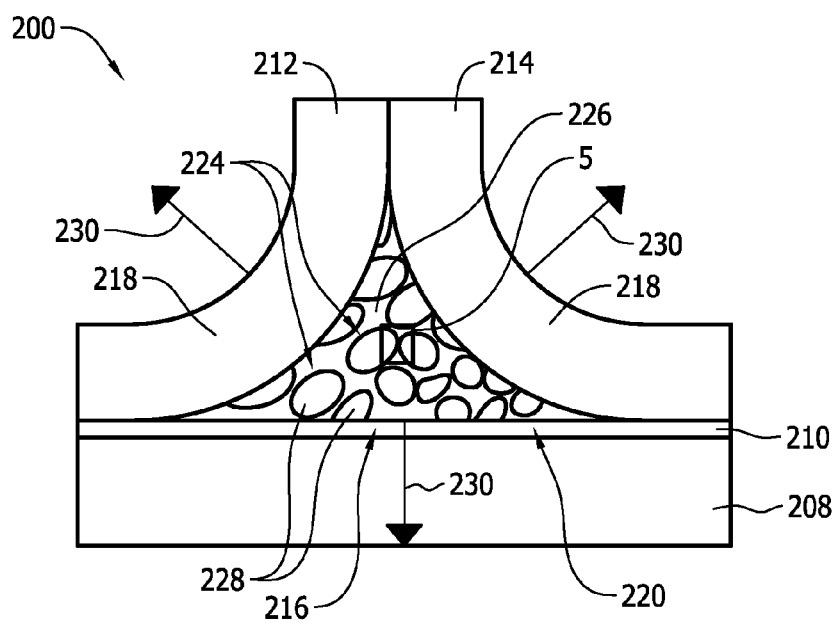
FIG. 4 is an enlarged schematic illustration of the composite structure shown in FIG. 3 taken along Area 4.

FIG. 3 is a schematic illustration of an exemplary composite structure 200 that may be used in aircraft 102 (shown in FIG. 2), and FIG. 4 is an enlarged schematic illustration composite structure 200 taken along Area 4. In the exemplary implementation, composite structure 200 includes a plurality of components 204 coupled together to form a T-joint 206. Components 204 include a skin panel 208, a plank 210 coupled to skin panel 208, a first stiffener 212 coupled to plank 210, and a second stiffener 214 coupled to plank 210. Components 204 are oriented such that a radius gap 216 is defined between plank 210 and first and second stiffeners 212 and 214. More specifically, radius gap 216 extends along a length L of composite structure 200 and is defined at least partially by opposing complementary bent portions 218 of first and second stiffeners 212 and 214. In an alternative implementation, first and second stiffeners 212 and 214 may be coupled directly to skin panel 208. Moreover, alternatively, components 204 may have any configuration such that a joint defines a radius gap therebetween.

Composite structure 200 also includes a filler structure 220 positioned in radius gap 216. Referring to FIG. 4, filler structure 220 includes a closed cell foam core 222 including a plurality of core cells 224. Each core cell 224 includes side walls 226, and void spaces 228 defined by side walls 226 and substantially filled with air. As such, filler structure 220 does not include an amount of resin. Moreover, as will be described in more detail below, closed cell foam core 222 is fabricated from a material such that side walls 226 yield plastically in response to hydrostatic tensile forces 230 applied to and by composite structure 200. Specifically, void spaces 228 facilitate enabling closed cell foam core 222 to absorb energy and facilitate defining a porosity within closed cell foam core 222. The porosity of closed cell foam core 222 is selected such that closed cell foam core 222 has a predetermined energy absorbing capability and bulk compression stiffness. For example, in the exemplary implementation, closed cell foam core 222 includes a porosity within a range defined between about 20 percent and about 40 percent by volume of closed cell foam core 222.

Closed cell foam core 222 may be fabricated from any material that enables composite structure 200 to function as described herein. The material used to fabricate closed cell foam core 222 is selected based on whether the material includes certain physical properties at predetermined levels. Exemplary physical properties include, but are not limited to, bulk modulus, surface energy, and coefficient of thermal expansion. For example, the bulk modulus is selected to facilitate limiting deformation of closed cell foam core 222 when composite structure 200 is exposed to elevated pressures during manufacture thereof, the surface energy is selected such that closed cell foam core 222 remains coupled to components 204, and the coefficient of thermal expansion is selected such that the structural integrity of composite structure 200 is substantially maintained when exposed to changing environmental conditions. In the exemplary implementation, closed cell foam core 222 is fabricated from a silicone-based material such as RTV566 manufactured by Momentive Performance Materials Holdings, Inc. of Albany, N.Y.

Figure 5:
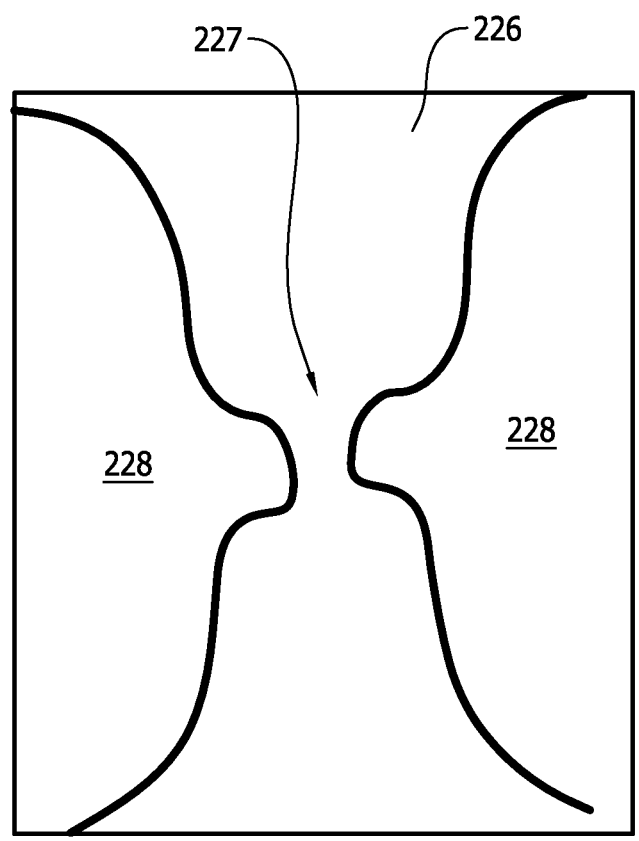
FIG. 5 is an enlarged schematic illustration of the closed cell foam core shown in FIG. 4.

FIG. 5 is an enlarged schematic illustration of closed cell foam core 222. As will be described in more detail below, at least one of heat or pressure are applied to components 204 to facilitate forming composite structure 200 (each shown in FIG. 3). In general, hydrostatic tensile forces 230 (shown in FIG. 4) are hydrostatic due to the inability of filler structure 220 to contract upon cooling from elevated temperatures during formation of composite structure 200. As such, side walls 226 locally stretch (i.e., are unable to contract) at narrowed regions 227 resulting in post-yield plastic deformation thereof. More specifically, side walls 226 are relatively thin membranes such that stretching side walls 226 is not hydrostatic. Rather, closed cell foam core 222 is fabricated from material that enables side walls 226 to locally yield at narrowed regions 227 to facilitate strain energy absorption therein.

Figure 6:
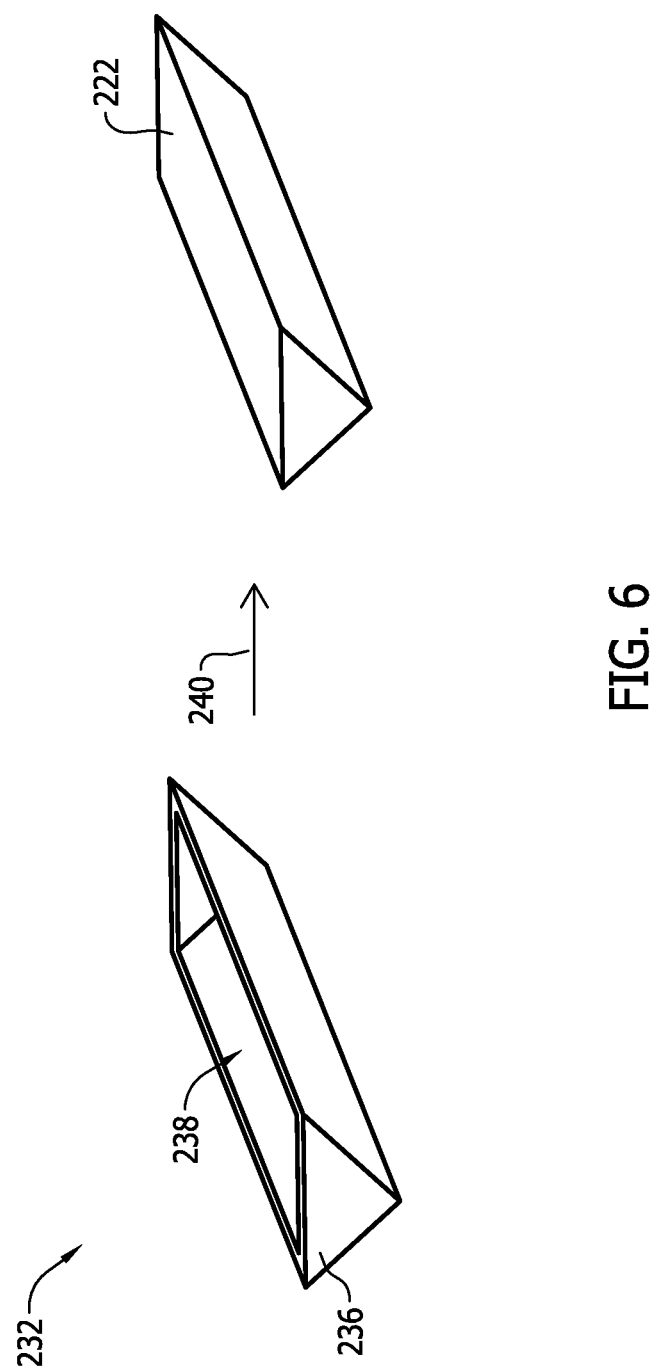
FIG. 6 is a schematic flow diagram illustrating an exemplary sequence of process steps of fabricating a closed cell foam core that may be used in the composite structure shown in FIG. 3.
Figure 7:
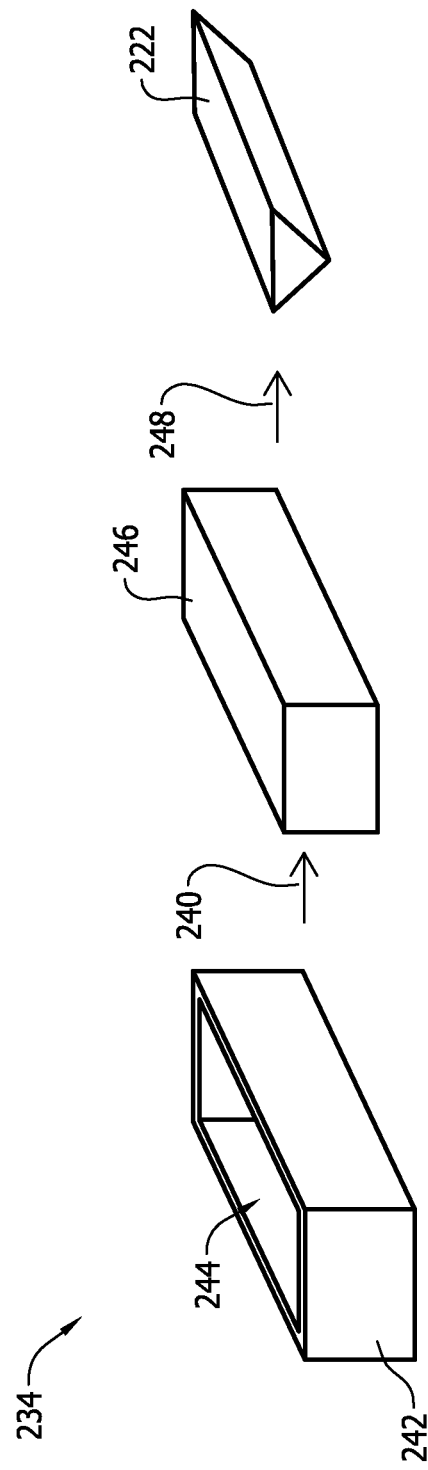
FIG. 7 is a schematic flow diagram illustrating an alternative sequence of process steps of fabricating the closed cell foam core shown in FIG. 6.

FIG. 6 is a schematic flow diagram illustrating an exemplary sequence 232 of process steps of fabricating closed cell foam core 222, and FIG. 7 is a schematic flow diagram illustrating an alternative sequence 234 of process steps of fabricating closed cell foam core 222. In the exemplary implementation, closed cell foam core 222 is fabricated by pouring a quantity of liquefied closed cell foam material (not shown) into a mold 236. Mold 236 includes an interior cavity 238 that receives the quantity of closed cell foam material and that has a shape substantially similar to a final desired shape of closed cell foam core 222. The quantity of closed cell foam material is then cured in a first processing step 240 such that closed cell foam core 222 has a cross-sectional shape substantially similar to radius gap 216 when it is formed. Moreover, first processing step 240 facilitates forming void spaces 228 in closed cell foam core 222. For example, first processing step 240 facilitates forming void spaces 228 by at least one of introducing a blowing agent into the quantity of closed cell foam material, or by fabricating closed cell foam core 222 via condensation polymerization. Exemplary blowing agents include either physical or chemical blowing agents such as, but not limited to, carbon dioxide, pentane, and carbonate materials.

Referring to FIG. 7, closed cell foam core 222 is fabricated by pouring a quantity of closed cell foam material into a mold 242. Mold 242 includes an interior cavity 244 that receives the quantity of closed cell foam material and that has any shape that enables sequence 234 to function as described herein. For example, in the exemplary implementation, interior cavity 244 has a substantially rectangular cross-sectional shape. The quantity of closed cell foam material is then cured in first processing step 240, as described above, such that an intermediate closed cell foam core 246 is formed. A size of intermediate closed cell foam core 246 is reduced in a second processing step 248, such as cutting, milling, or machining. As such, second processing step 248 is implemented to form intermediate closed cell foam core 246 into closed cell foam core 222 having a cross-sectional shape substantially similar to radius gap 216. Alternatively, a plurality of intermediate closed cell foam cores 246 may be fabricated in mold 242, coupled together, and subsequently reduced in size via second processing step 248 to form closed cell foam core 222. Moreover, alternatively, a plurality of closed cell foam cores 246 of varying shapes may be fabricated and coupled together in a predetermined orientation to form closed cell foam core 222.

Figure 8:
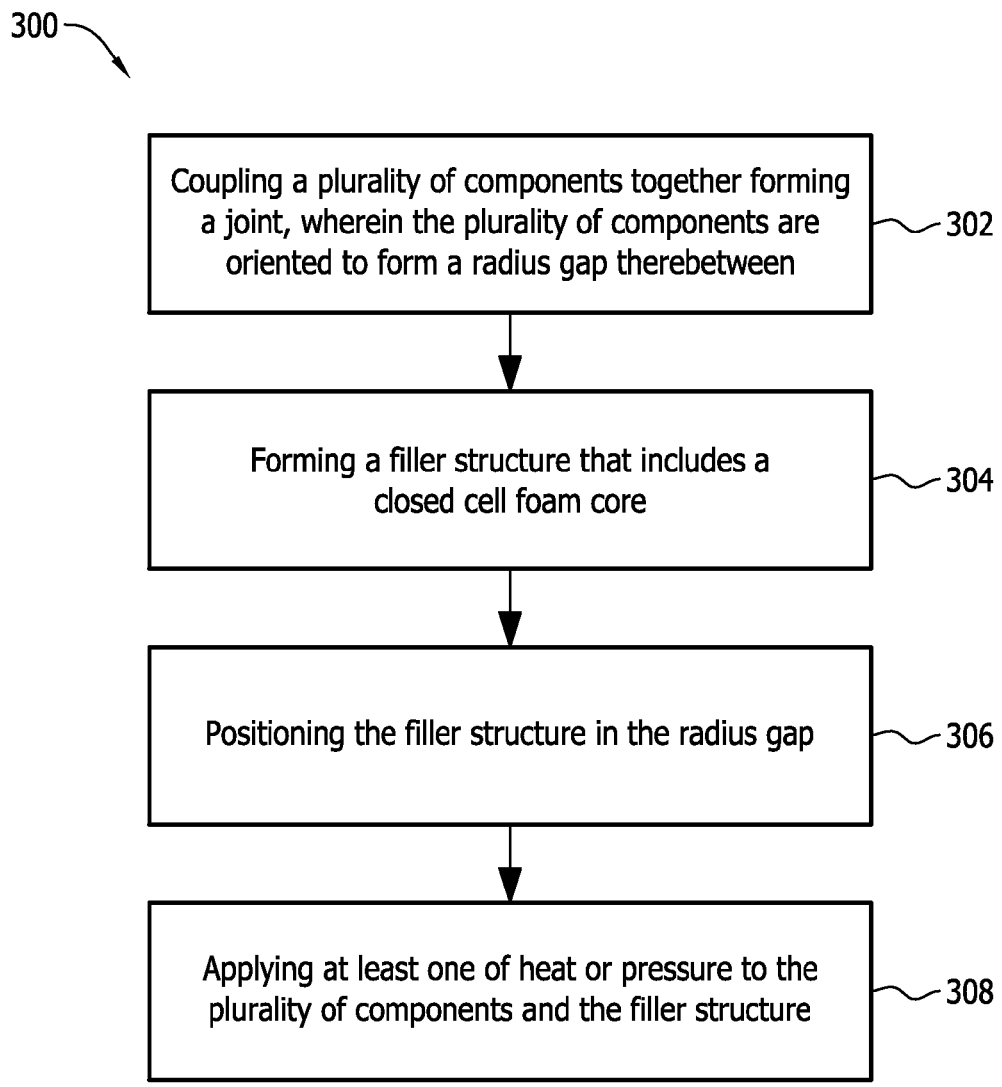
FIG. 8 is a flow diagram of an exemplary method of forming a composite structure.

FIG. 8 is a flow diagram of an exemplary method 300 of forming a composite structure, such as composite structure 200. Method 300 includes coupling 302 components 204 together to form T-joint 206, wherein components 204 are oriented to form radius gap 216 therebetween. A filler structure 220 is formed 304 that includes closed cell foam core 222. Method 300 also includes positioning 306 filler structure 220 in radius gap 216, and applying 308 at least one of heat or pressure to components 204 and filler structure 220. The heat and/or pressure may be applied via a vacuum bagging process, and/or composite structure 200 may be placed in an autoclave (not shown).

In some implementations, forming 304 filler structure 220 includes pouring a quantity of closed cell foam material into mold 236 having a cross-sectional shape substantially similar to a cross-sectional shape of radius gap 216, and curing the quantity of closed cell foam material in mold 236. Alternatively, forming 304 includes pouring a quantity of closed cell foam material into mold 242, curing the quantity of closed cell foam material in mold 242 to form intermediate closed cell foam core 246, and forming intermediate closed cell foam core 246 such that filler structure 220 has a cross-sectional shape substantially similar to a cross-sectional shape of radius gap 216. Forming intermediate closed cell foam core 246 includes at least one of cutting, milling, or machining intermediate closed cell foam core 246.

Forming 304 filler structure 220 also includes fabricating closed cell foam core 222 from a closed cell foam material having a bulk modulus that facilitates limiting deformation of filler structure 220 when the pressure is applied 308, and fabricating closed cell foam core 222 from a silicone-based material. In one implementation, forming 304 filler structure 220 includes forming closed cell foam core 222 including side walls 226 configured to yield plastically in response to hydrostatic tensile forces 230, and forming void spaces 228 defined by side walls 226. The void spaces 228 are substantially filled with air.

In some implementations, forming 304 filler structure 220 includes forming closed cell foam core 222 including a porosity within a range defined between about 20 percent and about 40 percent by volume of closed cell foam core, and forming 304 filler structure 220 that does not include an amount of resin.

The implementations described herein relate to filler structures that facilitate restricting delamination of a composite structure from initiating in a noodle region of the composite structure. The filler structure is fabricated from a closed cell foam core that includes side walls that yield plastically in response to hydrostatic tensile forces. For example, the side walls yield when the hydrostatic tensile forces are applied during manufacture of the composite structure, but the filler structure has a bulk modulus that facilitates limiting deformation of the closed cell foam core and maintaining a desired shape of the composite structure at increased pressures. Moreover, the filler structure does not include an amount of resin such that strain in the noodle region is absorbed by the closed cell foam core, and such that delamination caused by crack propagation in the resin is eliminated.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A composite structure comprising:
   a plurality of components coupled together forming a joint, wherein said plurality of components are oriented such that a gap is defined at least partially therebetween; wherein said plurality of components are coupled together such that said gap extends along a length of said plurality of components; wherein at least one of said plurality of components comprises a bent portion such that a radius gap is defined between said plurality of components; and
   a filler structure positioned in said gap, said filler structure comprising a closed cell foam core having a porosity within a range defined between about 20 percent and about 40 percent by volume of said closed cell foam core, and said filler structure pre-formed and having a cross-sectional shape substantially similar to a cross-sectional shape of said gap; and wherein said closed cell foam core is fabricated from a silicone-based material.

2. The composite structure in accordance with claim 1, wherein said closed cell foam core comprises a plurality of core cells that comprise side walls configured to yield plastically in response to hydrostatic tensile forces.

3. The composite structure in accordance with claim 2, wherein said plurality of core cells comprise void spaces defined by said side walls, said void spaces substantially filled with air.

4. The composite structure in accordance with claim 1, wherein the porosity is selected such that said closed cell foam core has a predetermined energy absorbing capability.

5. The composite structure in accordance with claim 1, wherein said filler structure does not comprise an amount of adhesive resin.

* * * * *